United States Patent [19]

Reed et al.

[11] Patent Number: 4,642,235
[45] Date of Patent: Feb. 10, 1987

[54] CHEWING GUM WITH CENTER FILL COMPRISING THAUMATIN OR MONELLIN AND METHOD

[75] Inventors: Michael A. Reed; Gordon N. McGrew, both of Evanston, Ill.

[73] Assignee: Wm. Wrigley Jr. Company, Chicago, Ill.

[21] Appl. No.: 665,174

[22] Filed: Oct. 26, 1984

[51] Int. Cl.$^4$ .............................................. A23G 3/30
[52] U.S. Cl. ...................................... 426/5; 426/548; 426/804
[58] Field of Search ........................................ 426/3-6

[56] References Cited

U.S. PATENT DOCUMENTS 3,894,154 7/1975 Graff et al. .
4,156,740 5/1979 Glass et al. .
4,157,402 6/1979 Ogawa et al. .
4,228,198 10/1980 Burge et al. .
4,250,196 2/1981 Friello .
4,292,329 9/1981 Ogawa et al. .
4,300,576 11/1981 van der Loo et al. .
4,301,178 11/1981 Witzel et al. .
4,316,915 2/1982 Friello et al. .
4,412,984 11/1983 van der Loo et al. .

Primary Examiner—Jeanette Hunter
Attorney, Agent, or Firm—Willian Brinks Olds Hofer Gilson & Lione Ltd.

[57] ABSTRACT

A center-filled chewing gum comprises a chewing gum base shell enclosing an internal void and a center fill in the void. The center fill comprises a thaumatin or monellin sweetener constituting from about 5 to about 100 ppm by weight of the chewing gum.

12 Claims, No Drawings

CHEWING GUM WITH CENTER FILL COMPRISING THAUMATIN OR MONELLIN AND METHOD

BACKGROUND OF THE INVENTION

This invention relates generally to chewing gum and, in particular, to chewing gum having a center fill.

Chewing gums having an edible center fill enclosed by a chewable gum base shell are well-known in the art. See, for example, Friello U.S. Pat. No. 4,316,915 and Glass U.S. Pat. No. 4,156,740.

Such center-filled chewing gums typically consist of a gum base shell and a center fill composition comprising one or more carbohydrate syrups, glycerine, thickeners, flavors, acidulants, colors, sugars and sugar alcohols.

Thaumatin is a proteinaceous substance obtained from the fruit of the tropical plant *Thaumatococcus daniellii* which grows in tropical Africa. Thaumatin is about 2,000 to 3,000 times sweeter than sucrose and is known to have lingering sweet aftertaste. The sweet protein monellin, obtained from the fruit of the tropical plant *Dioscoreophyllum cumminsii*, has taste properties similar to thaumatin.

Thaumatin and monellin, apart from their intense sweetness, are recognized as high-potency flavor and sweetness adjuvants capable of potentiating sweetness and flavor in chewing gum compositions. See, for example, van der Loo et al. U.S. Pat. No. 4,412,984 and Burge et al. U.S. Pat. No. 4,228,198.

Unfortunately, thaumatin and monellin are expensive and, when mixed directly with gum base and other ingredients in a conventional manner, must be present in substantial amounts before a noticeable flavoring or sweetness enhancement can be achieved. It is theorized that the thaumatin or monellin tend to become bound up in the gum base when mixed directly with the base, with the result that the base masks the flavor and sweetness potentiating effects of these sweet proteins.

DESCRIPTION OF THE PRESENTLY PREFERRED EMBODIMENTS OF THE INVENTION

The present invention is directed to a centerfilled chewing gum comprising a chewing gum base shell enclosing an internal void and a center fill in the void, the center fill comprising a sweetener selected from the group consisting of thaumatin or monellin. The thaumatin or monellin constitutes from about 5 parts per million (ppm) to about 100 ppm by weight of the chewing gum.

According to the present invention, the placement of thaumatin or monellin in the center fill of a center-filled chewing gum results in substantial advantages, in particular an improvement in the overall taste characteristics of the chewing gum. Furthermore, when the thaumatin or monellin is contained in the center fill as opposed to being mixed directly into the gum base, smaller quantities of the thaumatin or monellin are required to achieve comparable flavor and sweetness potentiation, resulting in cost savings.

The chewable gum base shell enclosing the center fill of the present invention comprises any chewable gum base in conventional amounts ranging from about 18% to about 99% by weight of the gum base shell.

The gum base shell may comprise a sweet, water-soluble bulking agent. For sugar gums, the bulking agent may comprise dextrose, sucrose, maltose, dextrin, dried invert sugar, fructose, levulose, galactose, corn syrup or corn syrup solids or combinations thereof. For sugarless gums, the bulking agent may comprise sugar alcohols such as sorbitol, mannitol, xylitol, or combinations thereof. The bulking agent typically comprises from about 30% to about 80% by weight of the gum base shell.

Conventional flavors such as liquid or spray-dried flavors may be incorporated in the gum base shell in amounts determined by preference, but preferably constituting about 1% by weight of the gum shell. The gum shell may also comprise a coloring agent in a conventional amount of about 0.1% to about 2.0% by weight of the shell and a plasticizing agent in an amount constituting about 0.1% to about 25% by weight of the gum shell.

The chewing gum composition for use in the shell portion of the present center-filled gum can be manufactured in a conventional manner. First, the base is heated and placed in a running mixer. If coloring is desired it may be added at this point followed by the bulking agent, the plasticizing agent and flavor. When the chewing gum is removed from the mixer it is combined with the center fill using conventional product-forming equipment in a known manner. Such product-forming equipment preferably includes an extruder (such as a Weisert, Loser & Sohn Model KE4); a sizer (such as a Hansella Model 165A); a Uniplast machine (such as a Hansella Model 160C); and a cooling tunnel (such as a Hansella Model 170B); because the nature and operations of such equipment are well-known in the art, further descriptions thereof are believed to be unnecessary.

The center fill of the present invention may comprise one or more carbohydrate syrups, glycerine, thickeners, flavors, acidulants, colors, sugars and sugar alcohols in conventional amounts; the ingredients are combined in a conventional manner. According to the present invention, the center fill also contains thaumatin or monellin in an amount constituting from about 5 ppm to about 100 ppm by weight of the entire chewing gum, as previously stated. The thaumatin preferably comprises about 20 ppm by weight of the chewing gum; if monellin is used, the preferred amount is about 10 ppm by weight of the chewing gum. The center fill preferably comprises from about 1% to about 40% by weight of the chewing gum.

EXAMPLE

A center-filled chewing gum according to the present invention may be formulated as follows:

| Ingredients | Percent By Weight |
|---|---|
| Gum Shell Formula | |
| Gum Base | 18.69 |
| Corn Syrup | 7.79 |
| Powdered Sugar | 67.52 |
| Glycerine | 4.68 |
| Peppermint Oil | 1.27 |
| Coloring | .05 |
| Center Fill | |
| Carbohydrate Syrup | 99.7 |
| Peppermint Oil | .19 |
| Gum Arabic | .07 |
| Propylene Glycol | .03 |
| Thaumatin or Monellin | .01 |

The gum shell and center fill are manufactured and processed in a well-known manner. The final product comprises about 22% center fill and about 78% gum shell by weight. In this example, the final product contains 22 ppm thaumatin or monellin by weight.

It should be understood that the chewing gum composition and method described in detail herein are merely illustrative of various aspects of the present invention rather than limiting, and that the following claims, including all equivalents, are intended to define the scope of the invention.

We claim:

1. A center-filled chewing gum comprising a chewing gum base shell enclosing an internal void therein and a center fill in the void, the center fill comprising a sweetener selected from the group consisting of thaumatin and monellin in an amount greater than 5 ppm but less than 100 ppm by weight of the chewing gum.

2. The chewing gum of claim 1 wherein the center fill comprises from about 1% to about 40% by weight of the chewing gum.

3. The chewing gum of claim 1 wherein the sweetener is thaumatin.

4. The chewing gum of claim 3 wherein the thaumatin constitutes about 20 ppm by weight of the chewing gum.

5. The chewing gum of claim 1 wherein the sweetener is monellin.

6. The chewing gum of claim 5 wherein the monellin constitutes about 10 ppm by weight of the chewing gum.

7. A method of preparing a center-filled chewing gum having a gum base shell enclosing an internal void therein, comprising the step of filling the void with a liquid center fill comprising a sweetener selected from the group consisting of thaumatin and monellin in an amount greater than 5 ppm but less than 100 ppm by weight of the chewing gum.

8. The method of claim 7 wherein the center fill comprises from about 1% to about 40% by weight of the chewing gum.

9. The method of claim 7 wherein the sweetener is thaumatin.

10. The method of claim 9 wherein the thaumatin constitutes about 20 ppm by weight of the chewing gum.

11. The method of claim 7 wherein the sweetener is monellin.

12. The method of claim 11 wherein the monellin constitutes about 10 ppm by weight of the chewing gum.

* * * * *